US010273951B2

United States Patent
Bae

(10) Patent No.: US 10,273,951 B2
(45) Date of Patent: Apr. 30, 2019

(54) SOLAR PUMP SYSTEM AND METHOD FOR CONTROLLING SOLAR PUMP SYSTEM

(71) Applicant: LSIS CO., LTD., Anyang-si, Gyeonggi-do (KR)

(72) Inventor: Chaebong Bae, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/839,106

(22) Filed: Dec. 12, 2017

(65) Prior Publication Data

US 2018/0163716 A1 Jun. 14, 2018

(30) Foreign Application Priority Data

Dec. 14, 2016 (KR) .......................... 10-2016-0170128

(51) Int. Cl.
*H02M 5/458* (2006.01)
*H02P 23/00* (2016.01)
(Continued)

(52) U.S. Cl.
CPC ............ *F04B 49/06* (2013.01); *F04B 17/006* (2013.01); *F04D 13/06* (2013.01);
(Continued)

(58) Field of Classification Search
CPC ...... H02M 7/48; H02M 7/537; H02M 7/5375; H02M 5/4585; H02P 23/0036;
(Continued)

(56) References Cited

U.S. PATENT DOCUMENTS 4,999,560 A * 3/1991 Morishima ............... H02P 1/30
318/778
8,395,919 B2 3/2013 Schroeder et al.
(Continued)

FOREIGN PATENT DOCUMENTS

EP 2899606 A1 7/2015
GB 2176667 A 12/1986
(Continued)

OTHER PUBLICATIONS

Korean Office Action for related Korean Application No. 10-2016-0170128; action dated Jan. 18, 2018; (5 pages).
(Continued)

*Primary Examiner* — Timothy J. Dole
*Assistant Examiner* — Sisay G Tiku
(74) *Attorney, Agent, or Firm* — K&L Gates LLP

(57) ABSTRACT

A solar pump system comprises a solar module configured to generate DC power from sunlight, a water pump, an inverter configured to convert the DC power into AC power in order to drive the water pump, and a controller configured to generate a control signal for controlling an output frequency of the AC power. The controller compares the DC link voltage with a first reference level, adjusts the output frequency of the AC power, if the DC link voltage is greater than the first reference level, and determines the output frequency to prevent the DC link voltage from being equal to or less than a second reference level, if the DC link voltage is less than the first reference level.

11 Claims, 3 Drawing Sheets

(51) Int. Cl.
*H02P 21/32* (2016.01)
*H02P 21/12* (2016.01)
*H02P 27/00* (2006.01)
*H02P 29/024* (2016.01)
*H02M 7/48* (2007.01)
*H02M 7/537* (2006.01)
*H02M 7/5375* (2006.01)
*F04B 49/06* (2006.01)
*F04B 17/00* (2006.01)
*F04D 15/02* (2006.01)
*F04D 13/06* (2006.01)
*F24S 50/00* (2018.01)
*G05F 1/67* (2006.01)

(52) U.S. Cl.
CPC .......... *F04D 15/0281* (2013.01); *F24S 50/00* (2018.05); *G05F 1/67* (2013.01)

(58) Field of Classification Search
CPC ...... H02P 1/029; H02P 21/0032; H02P 21/12; H02P 27/00; H02P 29/025; H02P 6/08; B29C 2045/7673; B29C 2945/76033; B29C 2945/76525; B60L 11/1816; B60L 3/04; G06F 1/26
See application file for complete search history.

(56) References Cited

U.S. PATENT DOCUMENTS

| | | | |
|---|---|---|---|
| 8,810,069 | B2 | 8/2014 | Liu et al. |
| 8,922,185 | B2 | 12/2014 | Ehlmann et al. |
| 8,953,350 | B2 | 2/2015 | Kern |
| 9,467,066 | B1* | 10/2016 | Yu .......................... H02M 7/537 |
| 9,692,312 | B2* | 6/2017 | Yuasa ..................... H02P 27/06 |
| 9,768,679 | B2* | 9/2017 | Chae ....................... H02M 1/36 |
| 2009/0279336 | A1* | 11/2009 | Erdman ............ H02M 7/53875 363/131 |
| 2011/0210613 | A1* | 9/2011 | O'Brien .................... H02J 3/32 307/82 |
| 2012/0026769 | A1* | 2/2012 | Schroeder ............... H02J 3/383 363/131 |
| 2012/0062202 | A1* | 3/2012 | Min .......................... G05F 1/67 323/299 |
| 2012/0326644 | A1 | 12/2012 | Patanaik, et al. |
| 2013/0154536 | A1* | 6/2013 | Park ....................... H02M 7/797 318/503 |
| 2014/0211530 | A1* | 7/2014 | Chen ................. H02M 7/53871 363/132 |
| 2015/0091487 | A1* | 4/2015 | Shenoy ............... F04D 15/0088 318/503 |
| 2015/0236589 | A1* | 8/2015 | Baba ........................ G05F 1/67 307/82 |
| 2017/0207741 | A1* | 7/2017 | Kim ........................ H02J 3/385 |
| 2017/0250540 | A1* | 8/2017 | Varma ..................... H02M 7/44 |

FOREIGN PATENT DOCUMENTS

| | | |
|---|---|---|
| JP | H05265582 A | 10/1993 |
| JP | H06230838 A | 8/1994 |
| JP | H0895655 A | 4/1996 |
| JP | 2000060179 A | 2/2000 |
| JP | 2013126371 A | 6/2013 |
| KR | 101236621 B1 | 2/2013 |

OTHER PUBLICATIONS

European Search Report for related European Application No. 17205425.6; report dated May 15, 2018; 10 pages.
Japanese Office Action for related Japanese Application No. 2017-239604; dated Nov. 7, 2019; (2 pages).
Japanese Notice of Allowance for related Japanese Application No. 2017-239604; action dated Feb. 19, 2019; (3 pages).

* cited by examiner

SOLAR PUMP SYSTEM AND METHOD FOR CONTROLLING SOLAR PUMP SYSTEM

CROSS-REFERENCE TO RELATED APPLICATION

Pursuant to 35 U.S.C. § 119(a), this application claims priority to Korean Patent Application No. 10-2016-0170128, filed on Dec. 14, 2016, the entire contents of which are hereby incorporated by reference.

BACKGROUND

The present invention relates to a solar pump system and a method of controlling the solar pump system.

A solar pump system refers to a system for driving a pump through an inverter using energy generated by a solar module and generating and supplying fresh water. Such a solar pump system can most efficiently supply water and electricity. The solar pump system is used for supply of drinking water or agricultural water or seawater desalination in an area in which water supply infrastructure is insufficient. In addition, the solar pump system is considered as an optimal system for pumping and supplying underground water without supplying additional energy in a remote area, in which it is difficult to supply power, to solve water and electric power shortage in the remote area. The Indian government permitted installation of 50,000 solar pumps in 2004, for irrigation and drinking water supply, and has increased the number of solar pumps up to now.

Meanwhile, one important control method in a solar inverter for generating power using sunlight is a maximum power point tracking (MPPT) control method. The solar inverter always generates maximum power through MPPT control for tracking a maximum power generation point of a solar cell.

A basic control method of MPPT control methods is a hill climbing method. In this method, a duty ratio is changed by a predetermined displacement to find a maximum power point. In the hill climbing method, a controller is simple but a maximum power point estimation speed is low when an amount of solar radiation is rapidly changed.

A most general control method of the MPPT control methods is a perturbation and observation method. In this method, power change is measured according to increase or decrease of a voltage to perform operation at a maximum power point. However, in this method, when the amount of light is low, control properties may deteriorate.

Meanwhile, in an incremental conductance method of the MPPT control methods, a property that a solar cell outputs a maximum value when impedance of a load is equal to that of the solar cell is used. The incremental conductance method is excellent in terms of tracking performance but requires many complex operations.

FIG. 1 is a diagram showing the configuration of a conventional solar pump system.

In the conventional solar pump system, a controller 200 for controlling an inverter 100 receives input and output currents of the inverter 100 and the inverter 100 detects a voltage and current using a sensor to perform MPPT control. The conventional solar pump system should accurately detect the voltage and current. However, as detection accuracy increases, the price of the sensor provided in the solar pump system increases.

SUMMARY

An object of the present invention is to provide a solar pump system for tracking maximum power using a DC link voltage of an inverter without using an additional sensor, and a method of controlling the solar pump system.

The object of the present invention can be achieved by providing a solar pump system including a solar module configured to generate DC power from sunlight, a water pump, an inverter connected between the solar module and the water pump to convert the DC power into AC power in order to drive the water pump, and a controller configured to generate a control signal for controlling an output frequency of the AC power such that a DC link voltage of the DC power is constantly maintained, wherein the controller compares the DC link voltage with a first reference level, adjusts the output frequency of the AC power, if the DC link voltage is greater than the first reference level, and determines the output frequency to prevent the DC link voltage from being equal to or less than a second reference level, if the DC link voltage is less than the first reference level.

In another aspect of the present invention, provided herein is a method of controlling a solar pump system for controlling an inverter for converting DC power received from a solar module into AC power, including comparing the DC link voltage with a first reference level, adjusting the output frequency of the AC power, if the DC link voltage is greater than the first reference level, and determining the output frequency to prevent the DC link voltage from being equal to or less than a second reference level, if the DC link voltage is less than the first reference level.

DETAILED DESCRIPTION OF THE EMBODIMENTS

In order to provide a full understanding of the configurations and effects of the present invention, the preferred embodiments of the present invention will be described with reference to the accompanying drawings. However, the present invention is not limited to the following embodiments but may be variously modified. The description of the present embodiment is given so that the disclosure of the present invention will be thorough and complete and will fully convey the scope of the invention to those skilled in the art. In the accompanying drawings, the sizes of the elements may be greater than the actual sizes thereof, for convenience of description, and the scales of the elements may be exaggerated or reduced.

In the case in which a component is "connected" or "coupled" to another component, the components may be connected or coupled to each other directly or via an interposing component. In the case in which a component is "directly connected or coupled" to another component, it will be understood that an interposing component is not present. Other representations describing a relation between elements, such as "between" or "directly between" may be similarly interpreted.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

A singular representation may include a plural representation unless the context clearly indicates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

The terms used in the embodiments of the present invention have the same meanings as generally understood by a person having ordinary skill in the art to which the present invention pertains unless mentioned otherwise.

Hereinafter, preferred embodiments of the present invention will be described in detail with reference to the accompanying drawings.

Figure 1:
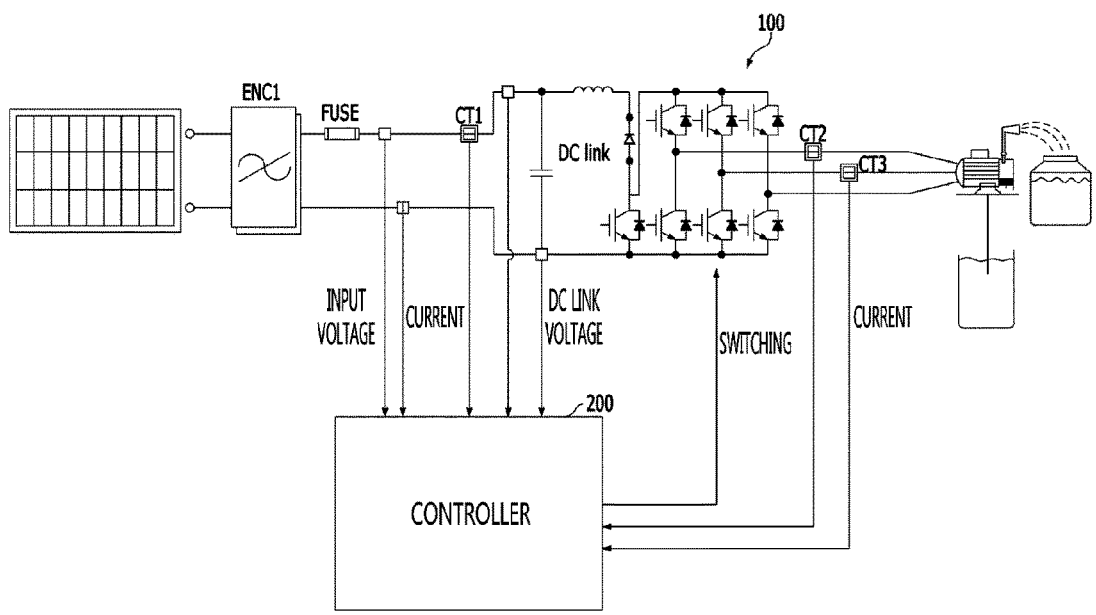
FIG. 1 is a diagram showing the configuration of a conventional solar pump system.
Figure 2:
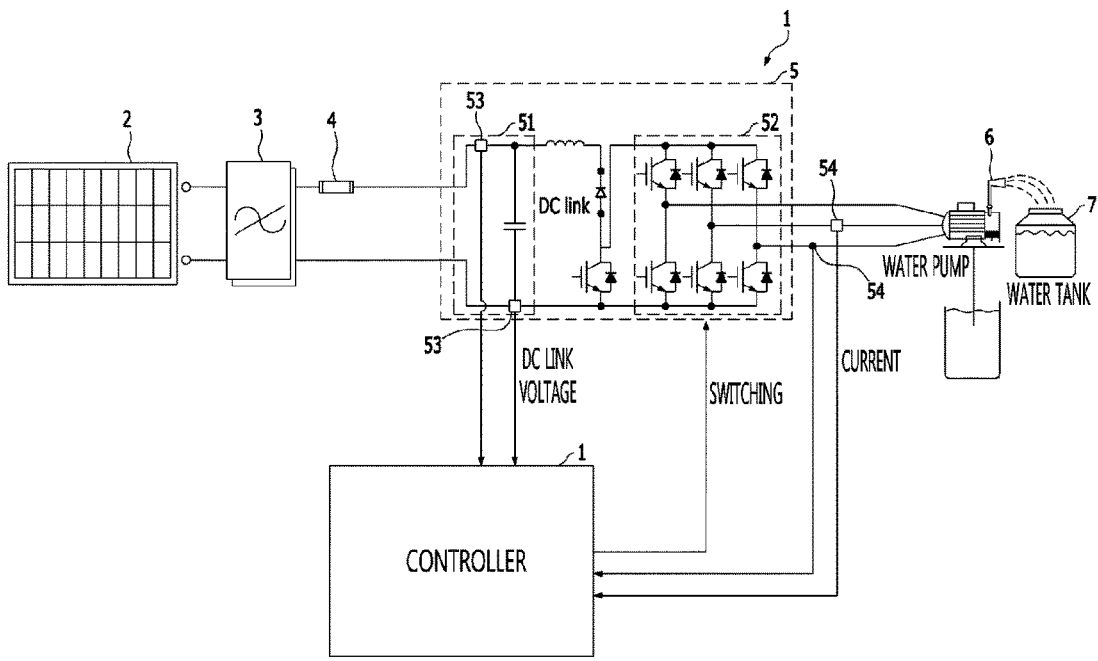
FIG. 2 is a diagram showing a solar pump system according to an embodiment of the present invention.

FIG. 2 is a diagram showing a solar pump system according to an embodiment of the present invention.

As shown in FIG. 2, the solar pump system according to the embodiment of the present invention may include a solar module 2, an electromagnetic compatibility (EMC) filter 3 and a fuse 4.

The solar module 2 may generate power from sunlight. The EMC filter 3 may minimize electromagnetic interference generated in power received from the solar module 2 and prevent damage due to such electromagnetic interference, thereby protecting a frequency. The fuse 4 may block excessive current. However, the EMC filter 3 and the fuse 4 are merely exemplary and various components for eliminating noise generated in power received from the solar module 2 may be provided.

The DC voltage, from which noise is eliminated, may be supplied to an inverter device 5 by the EMC filter 3 and the fuse 4.

A DC link capacitor 51 of the inverter device 5 may receive a DC voltage from the solar module 2 through the EMC filter 3 and the fuse 4. The DC link capacitor 51 may convert a DC voltage into a DC link voltage. The converted DC link voltage may be supplied to the controller 1. The controller 1 may generate a switching signal based on the DC link voltage and supply the generated switching signal to the inverter 52. The switching signal may control switching of the switching element of the inverter 52. That is, the output frequency of AC power may be controlled by the switching signal provided by the controller 1, which will be described below. The switching signal is a control signal, e.g., a PWM signal. As the duty ratio of the PWM signal is changed, the ON time or ON period of the inverter 52 may be changed and thus the output frequency of the AC power output from the inverter 52 may be changed.

The inverter 52 may be switched in response to the switching signal received from the controller 1 to convert DC power into AC power.

Change in DC link voltage of the inverter device 5 may be changed by the amount of solar radiation. For example, change in DC link voltage may be decreased if the DC link voltage is sufficient and may be increased if the DC link voltage is insufficient.

A water pump 6 may be driven by the AC power output from the inverter 52 of the inverter device 5. Water pumped by the water pump may be stored in a water tank 7. Water stored in the water tank 7 may be used as drinking water, industrial water, agricultural water, livestock water, etc.

In one embodiment of the present invention, the solar pump system may further include a voltage sensor 53 for detecting the DC link voltage of the DC link capacitor 51 of the inverter device 5 and a current sensor for detecting the output current of the inverter 52.

If rapid frequency change is encountered, the water pump 6 may break down. In order to prevent breakdown, according to the control method of the embodiment of the present invention, the frequency may be stably decreased or increased if the DC link voltage is sufficient and may be rapidly decreased if the DC link voltage is insufficient (that is, if the DC link voltage is equal to or less than a predetermined reference voltage). The DC link voltage being sufficient may mean that the DC link voltage is equal to or greater than a reference value. The DC link voltage being insufficient may mean that the DC link voltage is equal to or less than the reference value. By the control method of the embodiment of the present invention, the DC link voltage may be no longer decreased even when the DC link voltage is sufficient or insufficient, such that energy generated by the solar module 2 is maximally used in a state in which a low voltage problem is not generated.

Conventionally, in order to drive the water pump, a DC link voltage is used as information for generating a PWM output waveform of the inverter 100 and detecting a low voltage/overvoltage. However, in one embodiment of the present invention, increase and decrease in DC link voltage may be continuously checked and an output frequency may be changed in order to prevent rapid change in DC link voltage according to the amount of solar radiation.

Rapid increase in DC link voltage causes an overvoltage problem, rapid decrease in DC link voltage causes a low voltage problem, and the water pump 6 cannot operate in the low voltage and high voltage state. Frequent stoppage or change in operation state of the water pump 6 may cause significant energy loss and failure of the water pump 6, similarly to rapid frequency change.

In the control method according to the embodiment of the present invention, the output frequency of the AC power of the inverter 52 may be determined such that the water pump 6 is not frequently stopped, the operation state thereof is not changed, or the output frequency is not rapidly changed.

Figure 3:
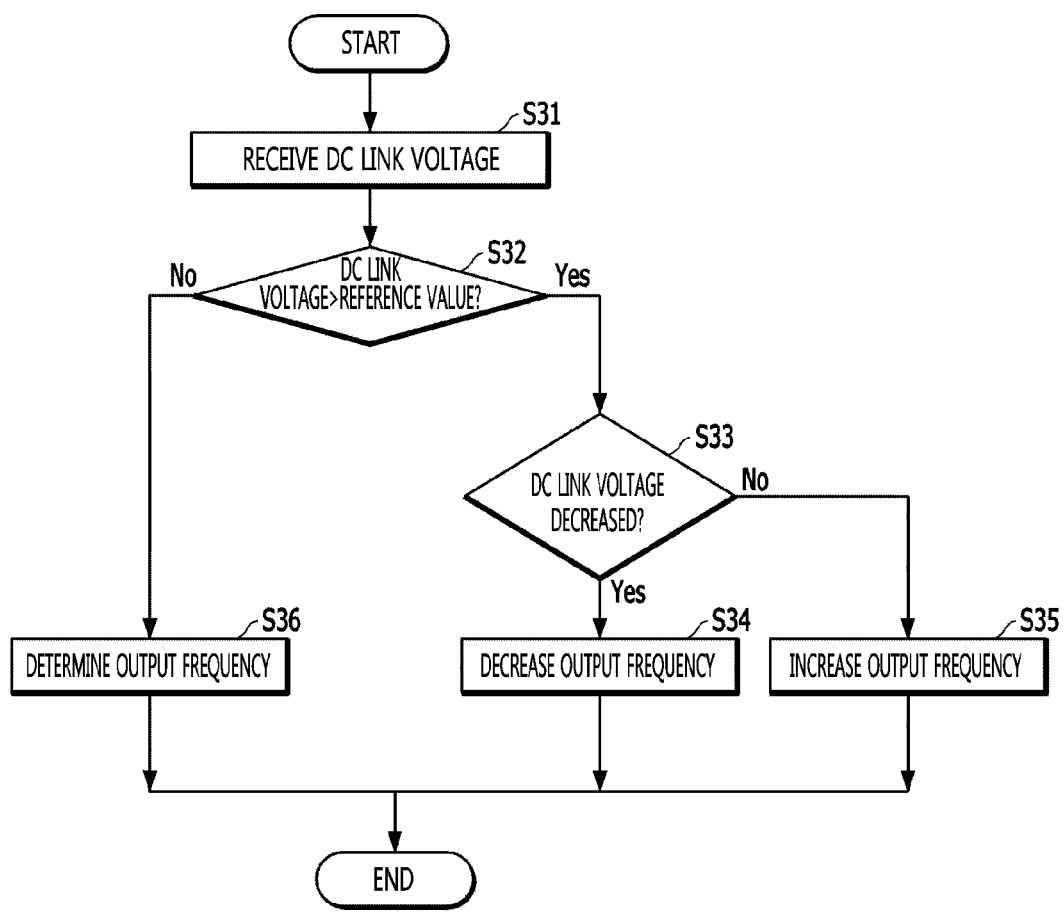
FIG. 3 is a flowchart illustrating a method of controlling a solar pump system according to an embodiment of the present invention.

FIG. 3 is a flowchart illustrating a method of controlling a solar pump system according to an embodiment of the present invention.

As shown in FIG. 3, the method of controlling the solar pump system according to the embodiment of the present invention is related to operation of the controller 1 of FIG. 2 and will be described with reference to FIGS. 2 and 3.

The controller 1 may receive the DC link voltage from the voltage sensor 53 (S31). The controller 1 may check whether the received DC link voltage is greater than a reference level (S32). That is, the controller 1 may check whether the DC link voltage is sufficient or insufficient by comparing the DC link voltage with the reference level.

If the DC link voltage is sufficient, that is, if the DC link voltage is equal to or greater than the reference level, the controller 1 may check whether the received DC link voltage is decreased (s33).

If the DC link voltage is decreased, the controller 1 may decrease the output frequency of AC power by a predetermined level (S34). A control signal may be generated such that the output frequency of the inverter 52 is decreased. The control signal may be a PWM signal, for example. For example, the PWM signal may be changed according to the decreased output frequency. For example, the duty ratio of the PWM signal may be increased.

The changed PWM signal may be supplied to the inverter 52. The inverter 52 may be switched in response to the PWM signal to decrease the output frequency of the AC power output from the inverter 52. The speed of the water pump 7 may be decreased by the decreased output frequency of the AC power and thus the DC link voltage may be increased.

Meanwhile, if the DC link voltage is not decreased as the checked result of S33, that is, if the DC link voltage is stable or increased, the controller 1 may increase the output frequency for controlling the inverter 52 (S35). The PWM signal may be changed by the increased output frequency. For example, the duty ratio of the PWM signal may be decreased.

The changed PWM signal may be supplied to the inverter 52. The inverter 52 may be switched in response to the PWM signal to increase the output frequency of the AC power output from the inverter 52. The speed of the water pump 6 may be increased by the increased output frequency of the AC power and thus the DC link voltage may be decreased.

That is, according to the control method of the present invention, if the DC link voltage of the inverter is sufficient, the output frequency may be increased or decreased and the water pump 6 may operate for a longest time at a highest speed.

Meanwhile, if the DC link voltage is not greater than the reference level as the checked result of S32, that is, if the DC link voltage is insufficient, the controller 1 may determine the output frequency to prevent the DC link voltage from being decreased to be equal to or less than the predetermined level (S35).

Figure 4:
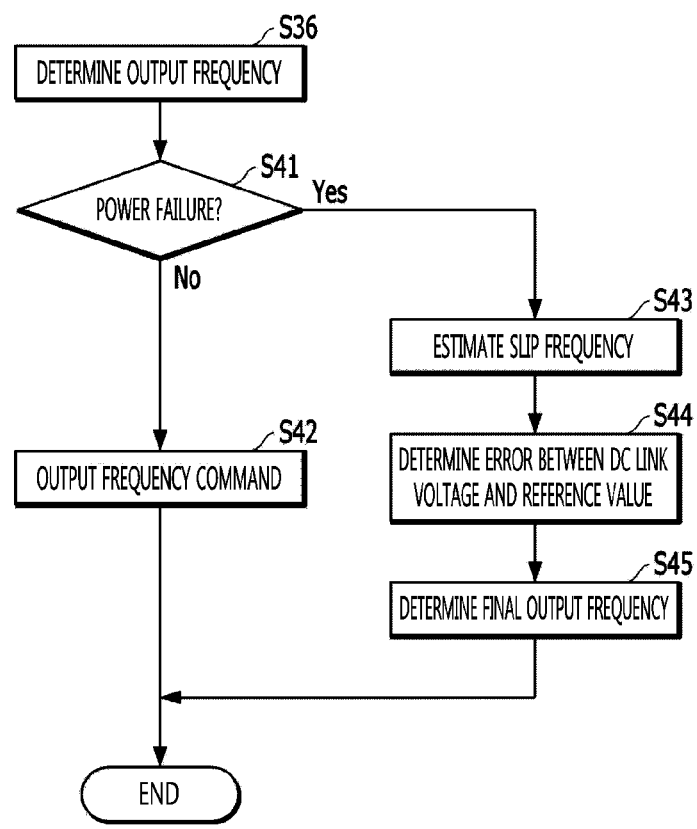
FIG. 4 is a flowchart illustrating step S36 of FIG. 3 in detail.

FIG. 4 is a flowchart illustrating step S36 of FIG. 3 in detail.

As shown in FIG. 4, in order to determine the output frequency to prevent the DC link voltage from being degreased to be equal to or less than the reference level, the controller 1 may determine whether power failure occurs (S41). At this time, when the DC link voltage is less than a reference level of power failure, it may be determined that power failure occurs.

If power failure does not occur as the checked result of S41, a frequency command predetermined to be output when the DC link voltage is equal to or less than the reference level may be output as the output frequency (S42). Therefore, if the DC link voltage is decreased to be equal to or less than the reference level, the controller 1 may decrease the operation speed of the water pump 6 to prevent the DC link voltage from being further decreased, thereby making the best use of energy generated by the solar module 2.

Alternatively, if power failure occurs as the checked result of S41, the controller 1 may estimate a slip frequency from the output current of the inverter device 5 received from the current sensor 54 (S43). Various methods of estimating the slip frequency from the output current of the inverter device 5 are well known in the field of the present invention and thus a detailed description thereof will be omitted. In addition, the controller 1 may determine an error between the DC link voltage and a DC link reference level (S44). Thereafter, the controller 1 may determine a final output frequency by adding the predetermined frequency command, the slip frequency and the error between the DC link voltage and the DC link reference level (S45), when power failure occurs. The inverter 52 may be switched by the final output frequency and the water pump 6 may be driven by switching of the inverter 52.

That is, if the DC link voltage is decreased by power failure, the controller 1 determines the final output frequency based on the frequency command, the slip frequency and the error between the DC link voltage and the DC link reference level when power failure occurs, such that the DC link voltage is prevented from being further decreased while decreasing the operation speed of the water pump 6 by switching the inverter 52 using the final output frequency.

In the present invention, since accurate sensing of the inverter output is not required and maximum power is tracked using the DC link voltage, it is possible to easily make the best use of energy generated by the solar module.

Although the invention has been described with reference to the exemplary embodiments, those skilled in the art will appreciate that various modifications and variations can be made in the present invention without departing from the spirit or scope of the invention described in the appended claims. Accordingly, the technical scope of the invention should be determined by the following claims.

What is claimed is:

1. A solar pump system comprising:
 a solar module configured to generate DC power from sunlight;
 a water pump;
 an inverter connected between the solar module and the water pump to convert the DC power into AC power in order to drive the water pump; and
 a controller configured to generate a control signal for controlling an output frequency of the AC power such that a DC link voltage of the DC power is constantly maintained,
 wherein the controller:
  compares the DC link voltage with a first reference level,
  determines the output frequency to prevent the DC link voltage from being equal to or less than a power failure reference level if the DC link voltage is less than the first reference level,
  checks whether a power failure occurs if the DC link voltage is less than the first reference level,
  determines the output frequency based on a predetermined frequency command, a slip frequency, and error information, upon determining that the power failure occurs, and
 wherein the error information is an error between the DC link voltage and a DC link reference level.

2. The solar pump system according to claim 1, wherein, if the output frequency of the AC power is determined, the controller generates a control signal for controlling the inverter at the determined output frequency.

3. The solar pump system according to claim 1, wherein the controller checks whether the DC link voltage is decreased if the DC link voltage is greater than the first reference level, and decreases the output frequency of the AC power if the DC link voltage is decreased.

4. The solar pump system according to claim 1, wherein the controller increases the output frequency of the AC power if the DC link voltage is greater than the first reference level and is stable or increased.

5. The solar pump system according to claim 1, wherein the controller determines that the power failure occurs if the DC link voltage is less than the power failure reference level.

6. The solar pump system according to claim 1, wherein the determined output frequency is obtained by adding the predetermined frequency command, the slip frequency and the error between the DC link voltage and the DC link reference level.

7. A method of controlling a solar pump system for controlling an inverter for converting DC power received from a solar module into AC power, the method comprising:
   comparing the DC link voltage with a first reference level,
   adjusting the output frequency of the AC power if the DC link voltage is greater than the first reference level, and
   determining the output frequency to prevent the DC link voltage from being equal to or less than a power failure reference level, if the DC link voltage is less than the first reference level,
   wherein determining the output frequency further includes:
      checking whether power failure occurs if the DC link voltage is less than the first reference level, and
      determining the output frequency by adding a predetermined frequency command, a slip frequency, and an error between the DC link voltage and a DC link reference level if the power failure occurs.

8. The method according to claim 7, wherein the adjusting of the output frequency of the AC power further includes, if the output frequency of the AC power is decreased, generating a control signal for controlling the inverter at the decreased output frequency.

9. The method according to claim 7, wherein the determining of the output frequency further includes, if the output frequency of the AC power is determined, generating a control signal for controlling the inverter at the determined output frequency.

10. The method according to claim 7, wherein adjusting the output frequency includes checking whether the DC link voltage is decreased if the DC link voltage is greater than the first reference level, and decreasing the output frequency of the AC power if the DC link voltage is decreased.

11. The method according to claim 10, wherein adjusting the output frequency further includes increasing the output frequency of the AC power if the DC link voltage is stable or increased.

* * * * *